(12) United States Patent
Sharma et al.

(10) Patent No.: US 8,606,995 B2
(45) Date of Patent: Dec. 10, 2013

(54) PORTABLE ALARM CONFIGURATION/UPDATE TOOL

(75) Inventors: Raman Kumar Sharma, Toronto (CA);
Juan Francisco Bogarin Munoz, North York (CA); Timothy Myers, Prince Albert (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 385 days.

(21) Appl. No.: 12/414,688

(22) Filed: Mar. 31, 2009

(65) Prior Publication Data

US 2009/0248967 A1 Oct. 1, 2009

Related U.S. Application Data

(60) Provisional application No. 61/040,851, filed on Mar. 31, 2008.

(51) Int. Cl.
*G06F 12/00* (2006.01)

(52) U.S. Cl.
USPC ............... 711/115; 711/103; 711/E12.002

(58) Field of Classification Search
USPC ............... 711/115, 103, E12.002; 707/101; 717/174
See application file for complete search history.

(56) References Cited

U.S. PATENT DOCUMENTS

| | | | |
|---|---|---|---|
| 5,329,444 A * | 7/1994 | Takahashi et al. | 705/7.26 |
| 5,495,961 A * | 3/1996 | Maestre | 221/3 |
| 6,728,734 B2 | 4/2004 | Nolan et al. | |
| 2007/0130184 A1 * | 6/2007 | Hogg | 707/101 |
| 2007/0233342 A1 * | 10/2007 | DiCroce et al. | 701/36 |
| 2009/0248967 A1 * | 10/2009 | Sharma et al. | 711/103 |
| 2011/0012729 A1 * | 1/2011 | Hess | 340/539.13 |

FOREIGN PATENT DOCUMENTS

| | | | | |
|---|---|---|---|---|
| DE | 102008014076 A1 * | 9/2009 | | G08B 21/02 |
| EP | 0 639 823 A1 | 2/1995 | | |
| WO | WO 2004/073326 A2 | 8/2004 | | |

OTHER PUBLICATIONS

Derwent-ACC-No. 2009-N71537, Integrated device for use in medical alarm system in hospital, has memory card module connected with control unit, and display module electrically connected with control unit for receiving and displaying data analyzed by control unit, Sep. 2009.*
Response to Written Opinion and Amendment Pursuant to PCT Article 34 filed on Mar. 10, 2010, in the related PCT Int'l Patent Application No. PCT/CA2009/000146 (12 pages).
Paradox Security Systems, Product Catalogue, 2007, pp. 4 & 8, 2nd Edition, Canada.
Fortinet, MR4 Firmware and FortiUSB Guide, Fortigate-5000 Series, Feb. 1, 2007, p. 19, Version 3.0, USA.
International Preliminary Report on Patentability, mailed on Aug. 11, 2010, in the related PCT International Patent Application No. PCT/CA2009/000146 (8 pages).

* cited by examiner

*Primary Examiner* — Pierre-Michel Bataille
(74) *Attorney, Agent, or Firm* — Kacvinsky Daisak pllc

(57) ABSTRACT

A stand-alone portable alarm update tool includes a memory interface for receiving a computer readable memory; a serial port for interconnection to a security alarm panel, by way of a complementary port; a processor; and processor readable memory in communication with the processor, storing software adapting the processor to upload and download configuration files from a removable memory received by the memory port, to the alarm panel, by way of the serial port. Conveniently, the tool may be packaged in a hand-held casing, and which may also house a battery. In this way, the tool may be readily transported by an installer, without being unnecessary heavy or bulky.

31 Claims, 8 Drawing Sheets

PORTABLE ALARM CONFIGURATION/UPDATE TOOL

CROSS-REFERENCE TO RELATED APPLICATIONS

This application claims benefits from U.S. Provisional Patent Application No. 61/040,851 filed Mar. 31, 2008, the contents of which are hereby incorporated herein by reference.

FIELD OF THE INVENTION

The present invention relates generally to alarm systems, and more particularly to a device facilitating the updating of alarm panels. In particular, the invention relates to an alarm update tool that allows simple on-premises panel configuration and updating.

BACKGROUND OF THE INVENTION

Home and business alarms have become commonplace. Such alarms (often referred to as "security systems" or "alarm systems") typically include several sensors used to monitor unauthorized entry and other conditions at monitored premises, such as fire, smoke, toxic gases, high/low temperature (e.g. freezing) or flooding, at a premises. In response to sensing an alarm condition, one or more of these sensors provides a signal to an alarm panel that in turn may sound and notify the occurrence of the alarm to occupants of the premises and remotely signal a monitoring station or other third party. Modern alarm panels typically include a processor, under software control.

Typically the occurrence of an alarm is signalled to a remote monitoring station that may then dispatch capable authorities to intervene at the premises. For example, in the case of sensing an unauthorized entry to the premises, the monitoring station may dispatch security personnel, typically in the form of private security guards or police officers.

In order for the alarm system to properly signal the monitoring center, the system must be properly installed and configured. Installation requires installing the central panel; placing sensors; ensuring the sensors and panel are provided with a source of power; connecting the central panel with a communications network; pairing the sensors to the panel; and programming the panel to place a communication to the monitoring center in the case of an alarm.

In view of the complexity of properly installing and configuring a typical alarm system, errors are often made. To facilitate configuration of such system, modern panels—themselves small computing devices—may be interconnected to an external computing device, such as a laptop computer, to allow setting of configuration variables, and the loading of software. Commercially available software, such as for example the DSC® DLS-2002 download software (the "DLS software") is suitable for programming panels, storing configuration files, and uploading and downloading such files.

Likewise, configuration files in the form of updated software/firmware loads often need to be installed in order to keep the panel up to date, with the most recent software firmware loads that often include bug fixes, firmware updates, and the like. Again such software/firmware updates may be accomplished using an external computing device.

Unfortunately, transporting a computing device to an install premises is often cumbersome. Installers are often loath to transport the weight and bulk of a full-fledged computing device to an installation premises.

Accordingly there is a need for a portable, light weight configuration and installation tool.

SUMMARY OF THE INVENTION

Exemplary of an embodiment of the present invention, there is provided a stand-alone portable alarm update tool. The tool includes a memory interface for receiving a computer readable memory; a serial port for interconnection to a security alarm panel, by way of a complementary port; a processor; and processor readable memory in communication with the processor, storing software adapting the processor to upload and/or download configuration files from a removable memory received by the memory port, to the alarm panel, by way of the serial port. Conveniently, the tool may be packaged in a hand-held casing, and which may also house a battery. In this way, the tool may be readily transported by an installer, without being unnecessary heavy or bulky.

In accordance with an embodiment of the present invention, a method of updating configuration files of an alarm panel, includes: i) loading a configuration file into a removable computer readable memory; ii) connecting the removable computer readable memory to a memory port of a handheld portable alarm update tool, the handheld portable alarm update tool comprising a memory port for receiving the removable computer readable memory and a serial port for interconnection to a security alarm panel, by way of a complementary port; iii) interconnecting the handheld portable alarm update tool to a complementary port of the panel; iv) executing processor executable instructions on the processor of the handheld alarm update tool, causing the alarm update tool to upload the configuration file to the panel, by way of the serial port.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
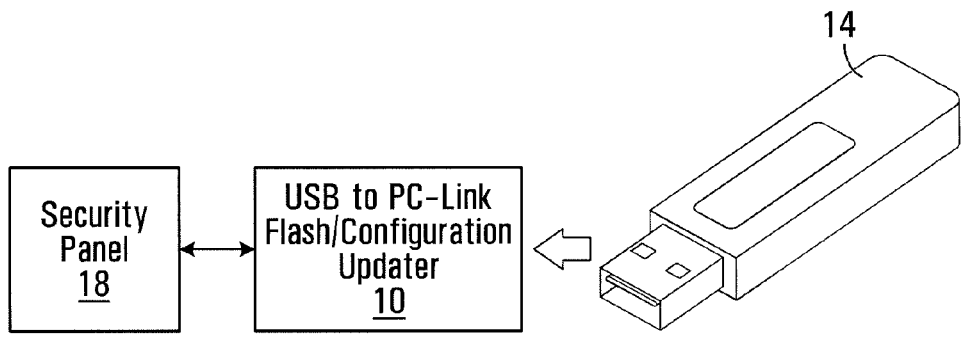
FIG. 1 is a simplified block diagram of an alarm update tool, as used, exemplary of an embodiment of the present invention.
Figure 2A:
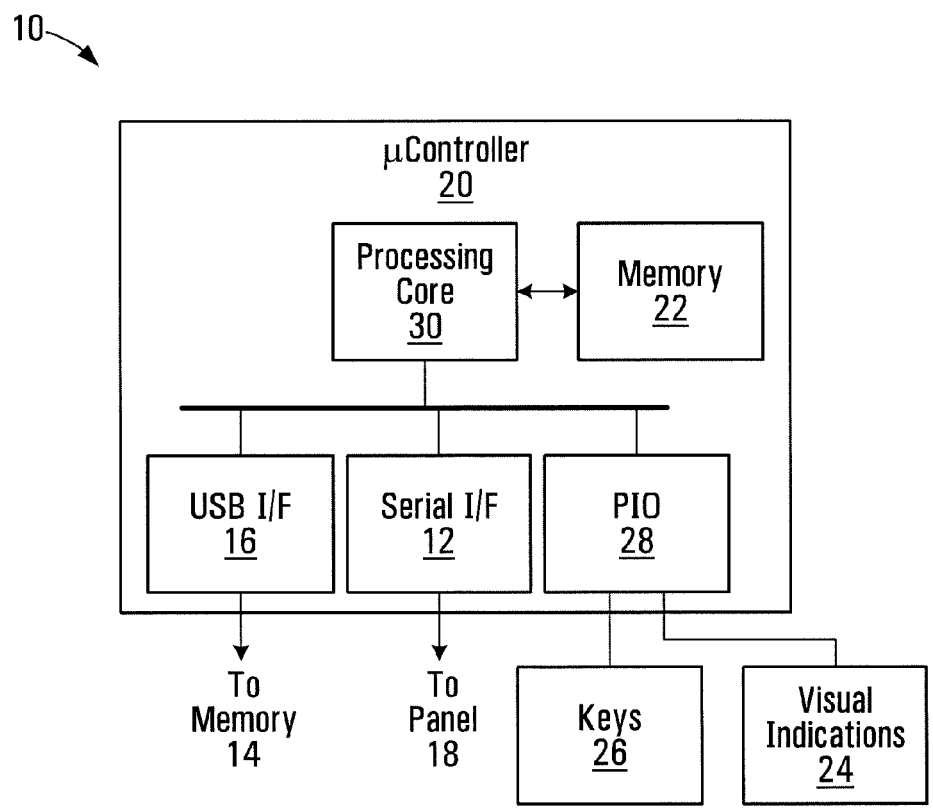
FIG. 2A is a schematic block diagram of the update tool of FIG. 1.
Figure 2B:
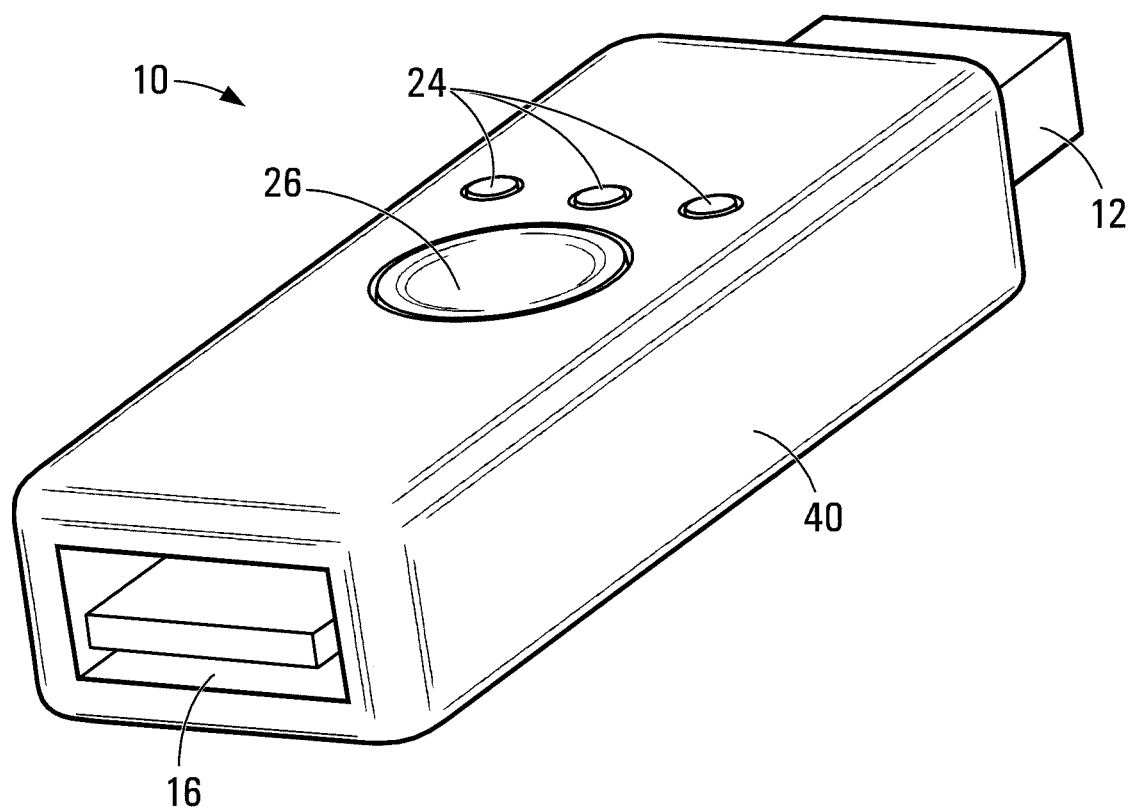
FIG. 2B is a perspective view of an exemplary update tool, exemplary of an embodiment of the present invention.

FIG. 1 illustrates an alarm update tool 10 and removable memory 14, exemplary of an embodiment of the present invention, interconnected with a conventional alarm panel 18. FIG. 2A is a schematic block diagram of update tool 10. FIG. 2B is a perspective view of alarm update tool 10, in an exemplary housing.

As illustrated, alarm update tool 10 includes at least one communication port 12, and an interface 16 for a removable memory 14. Communication port 12 allows alarm update tool 10 to be interconnected with an alarm panel update interface—typically in the form of a complementary serial port of a conventional alarm panel 18. Existing alarm panels, such as panel 18, typically include a serial port. The port may be an RS 232 port, a PC-link port, or a similar serial port, Infrared Data Association (IrDA)-compatible port. For example, a PC-link port is a four pin serial port—of which two pins are grounded (pins 2,3) and one pin (pin 1) acts as a transmit pin, while the remaining pin (pin 4) acts as a receive pin at a conventional alarm panel—such as a DSC® 1832, 1864 or the like. To this end, communication port 12 may take the form of a standard 4 pin PC-link connector for interconnection with the PC-link connector of alarm panel 18.

Removable memory 14 may take the form of a universal serial bus ("USB") flash memory key, interconnected with an interface 16, in the form of a memory port—specifically a USB port, forming part of alarm update tool 10. USB ports as well as the communications protocol used to read and write from USB memory are well known. In alternate embodiments, memory 14 could take the form of a flash memory card, such as a compact flash memory card, secure digital memory card, memory stick, or the like.

A block diagram of update tool 10 is depicted in FIG. 2A. An example physical embodiment of update tool 10 is depicted in FIG. 2B. As illustrated, update tool 10 includes port 12 and interface 16, in communication with a processor—in the form of programmable microcontroller 20. In the depicted update tool 10, programmable microcontroller 20 may be a microcontroller having an integrated USB interface 16. For example, microcontroller 20 may be an Amtel, Microchip, NetChip Tecnology, Motorola, Philips, or similar microcontroller. For example, microcontroller 20 may be an AT91 CAP Microcontroller. Microcontroller 20 also includes a programmable serial interface, acting as communications port 12. Microcontroller 20 may further include suitable processor readable memory 22, allowing loading of software controlling overall operation of update tool 10. Memory 22 maybe a combination of random access memory, read-only-memory, firmware memory, or the like.

Conveniently, serial port 12 may be a low voltage serial port, operating between 3 and 5 Volts, and possibly at the same voltage as microcontroller 20. As such, the low voltage serial port may be directly interconnected with a serial port, operating at a similar low voltage on panel 18.

Alarm update tool 10 further includes one or more visual indicator(s) 24, in the form of LEDs, an LCD panel, or the like used to indicate status and operating mode, interconnected with microcontroller 20. One or more switches 26—in the form of a push button or the like—may further form part of update tool 10, to provide a simple user interface to allow selection of operating mode of update tool 10, and selection of files, as detailed below. Switch(es) 26 may also be interconnected with microcontroller 20, allowing their state(s) to be sampled by microcontroller 20. Both switch(es) 26 and visual indicator(s) 24 may be interconnected with a parallel input/output (PIO) port 28 of microcontroller 20, as illustrated in FIG. 2A.

As will become apparent, software in the form of microcontroller program instructions within memory 22 allows alarm update tool 10 to read from memory 14, and provide data from removable memory 14 and provide the data in serialized form to port 12 to an interconnected alarm panel. As such, software within memory 22 may support a suitable file transfer protocol, and include instructions allowing update tool 10 to read and write files by way of port 12, using the supported protocol. For example software within memory 22 may support the X-modem; Z-modem; Kermit file transfer protocol; the ASCII dump protocol; the PC-link port protocol or the like. As will become apparent, panel 18 also supports the protocol, and thus communication and file transfer between update tool 10 and panel 18 are possible.

Conveniently, alarm update tool 10 may be packaged in a relatively small casing 40 (FIG. 2B) that may be light and portable. Conveniently it may be hand-held. An example casing 40 may be formed of injection molded plastic and have dimensions smaller than about 10 cm×5 cm×3 cm. Update tool 10 may be housed within this casing 40, along with a suitable power supply (not shown)—in the form of a battery or the like. Alternatively, update tool 10 may be powered from an external source of power, such as AC adapter (not shown), or possibly from panel 18.

In operation, instructions within memory 22 allow update tool 10 to operate in one or more modes. Example modes include i) uploading configuration files stored in memory 14 to an alarm panel (such as panel 18); ii) downloading of existing configuration files from an alarm panel 18 into memory 14; and iii) uploading of alarm panel 18 configuration files in the form of firmware files in memory 14 to an interconnected panel 18.

Files to be uploaded from memory 22 may be pre-loaded onto memory 22, in a conventional manner. For example, a file may be loaded into memory 14 by interconnecting the USB memory stick or card to a laptop or other computing device (not shown) and transferring the file onto the memory. The file may be an alarm panel configuration file, and may have been prepared using a text editor, or other software tool (such as DLS-2002 or similar alarm management software). The file should have an appropriate filename. In the illustrated embodiment, configuration files name may take the form "DCmodeIno_version_no.con", such as "DC1832_V_1.con". Firmware files name may take the form "DCmodeIno.bin", such as "DC1832_V_1.bin". Once the files are loaded onto memory 14, memory 14 may be interconnected with tool 10, through interface 16.

Port 12 is also interconnected with a panel (e.g. panel 18, FIG. 1) to be updated, through the panel's PC-link, RS-232 or similar port. Once connected to alarm panel 18, microcontroller instructions within memory 22 cause microcontroller 20 to operate as illustrated in FIG. 3A, 3B, 4 and 5. Corresponding message and data flow are depicted in FIGS. 6 and 6B.

Figure 3A:
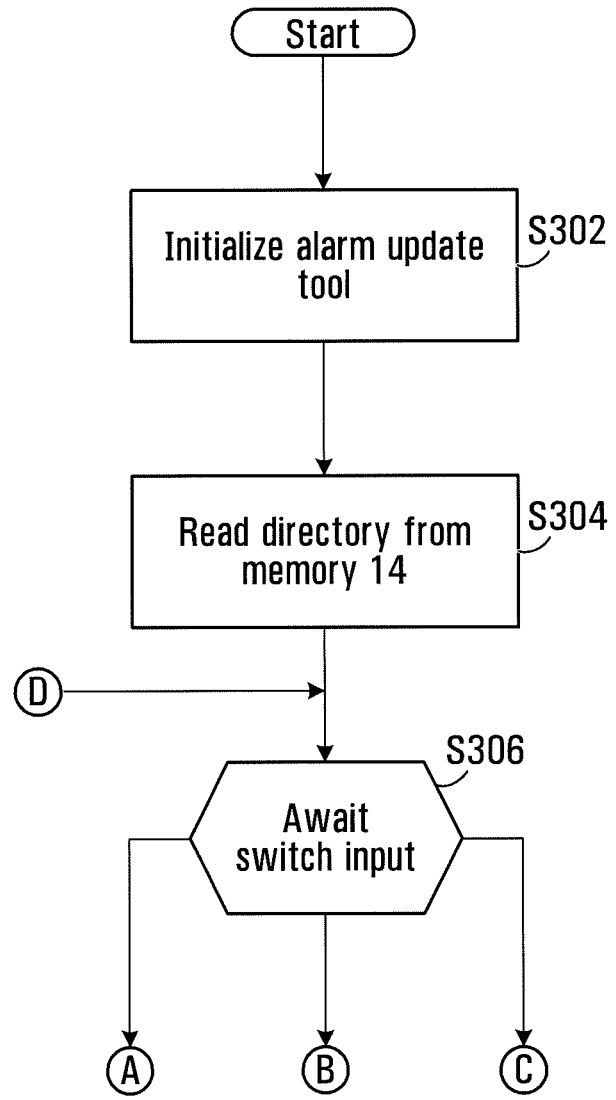
FIGS. 3A, 3B and 4-5 are flow diagrams illustrating the operation of software controlling the operation of the update tool of FIGS. 1 and 2.

As illustrated in FIG. 3A, upon being connected to a source of power, and optionally turned on, instructions within memory cause microcontroller 20 to execute a conventional power-up routine in block S302. In block S304, the file system of memory 14 is queried, and the directory structure of the file system is provided by memory 14 to microcontroller 20. The filenames of stored files may be temporarily stored within memory 22.

A particular mode of operation for update tool 10 may be selected through switch(es) 26. Feedback of a selected mode may be provided through indicators 24. For example, indicators 24 may include three LEDs, and one corresponding to each mode may be illuminated.

As such, in block S306 microcontroller 20 queries the state of switch(es) 26, and waits for these switches to assume a state to initiate operation in modes (i); (ii) and (iii).

In mode (i), device 10 assumes that memory 14 has been pre-loaded with with one or more files including alarm panel update data, in a conventional manner. As noted, the file should have an appropriate filename. In the illustrated embodiment, configuration files name may take the form "DCmodeIno_version_no.con", such as "DC1832_V_1.con".

Figure 3B:
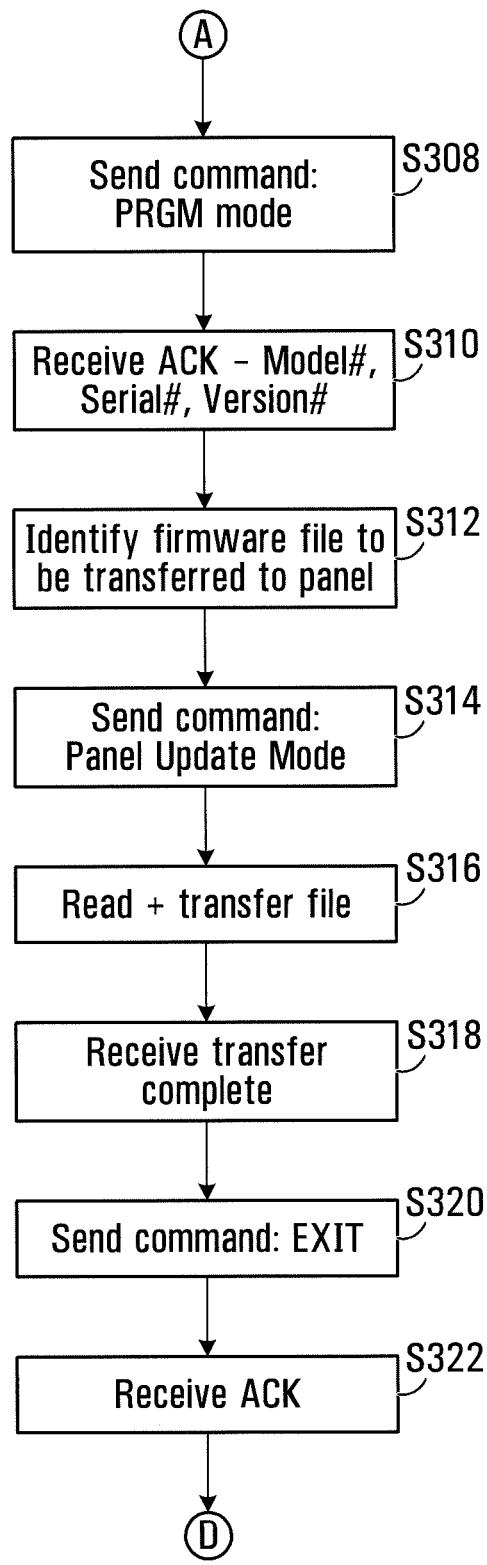
Figure 6A:
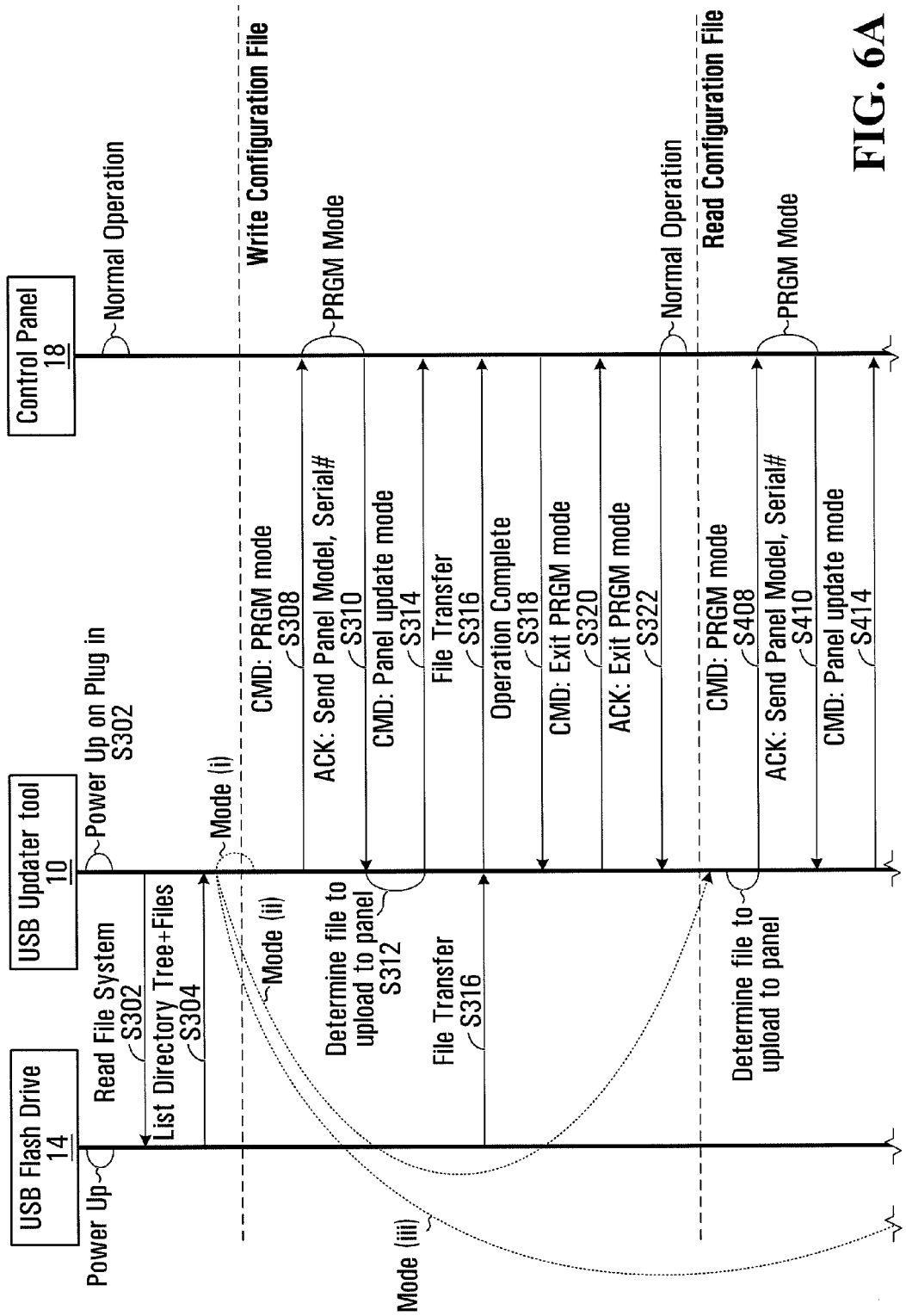
FIGS. 6A and 6B are flow diagrams illustrating the flow of data and messages in the update tool of FIGS. 1 and 2

Now, microcontroller 20 sends a suitable command to interconnected alarm panel 18 to place panel 18 in a programming mode in block S308 (FIGS. 3B, 6A). In block S310, microcontroller 20 receives an acknowledgement that alarm panel 18 is in program mode. The acknowledgment includes an identifier of the alarm panel (by model number) and optionally the alarm panel's serial number, and the version number of any existing configuration file(s) stored at panel 18.

Next, in block S312, microcontroller 20 uses the panel model number to form a filename of a desired file. The formed file number may take the form "DCmodeIno*.con". If the file is found in the directory structure now stored in memory 22, microcontroller 20 places panel 18 into update mode, by sending a suitable command to panel 18 in block S314. In block S316, microcontroller 20 transfers the file having the filename DCmodeIno*.con from memory 14 to alarm panel 18, using a file transfer (read) command identifying the file, from memory 14 and a file transfer (write) command to panel 18. Upon completion, microcontroller 20 receives a transfer complete message from alarm panel 18 in block S318. In response, microcontroller 20 sends a command to exit programming mode to panel 18 in block S320. If all is successful, microcontroller 20 receives an operation complete message in block S322. Panel 18 may return to its normal operating mode.

Optionally, prior to transferring the file DCmodeIno*.con to panel 18, microcontroller 20 may compare the version number returned in block S310 to ensure that the version number in memory 22 supersedes the version number of the file at panel 18. If not, the file need not be transferred.

Figure 4:
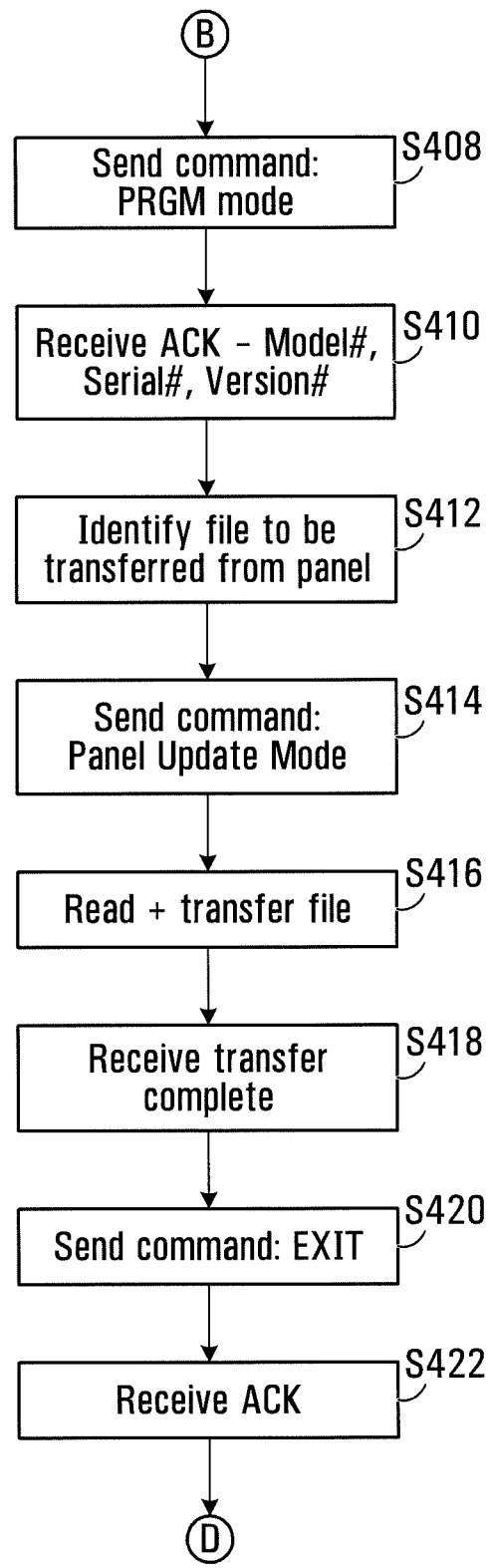

In mode ii) instructions within memory 22 cause microcontroller 20 to operate as illustrated in FIG. 4, 6A and 6B to transfer a configuration file from panel 18 to memory 14. As illustrated, microcontroller 20 again sends a suitable command to interconnected alarm panel 18 to place panel 18 in a programming mode in block S408. In block S410, microcontroller 20 receives an acknowledgement that alarm panel 18 is in program mode. Next, in block S412, microcontroller 20 uses the panel model number to form a filename of a desired configuration file to download from panel 18. The formed file name may take the form "DCmodeIno*.con". In block S416, microcontroller 20 may transfer the file having the filename DCmodeIno*.con from alarm panel 18, using a file transfer (read) command identifying the file, from panel 18 and a file transfer (write) command to memory 14. Upon completion, microcontroller 20 receives a transfer compete message from alarm panel 18 in block S418. In response microcontroller 20 sends a command to exit programming mode to panel 18 in block S420. If all is successful, microcontroller 20 receives an operation complete message in block S422. Panel 18 may return to its normal operating mode.

Figure 5:
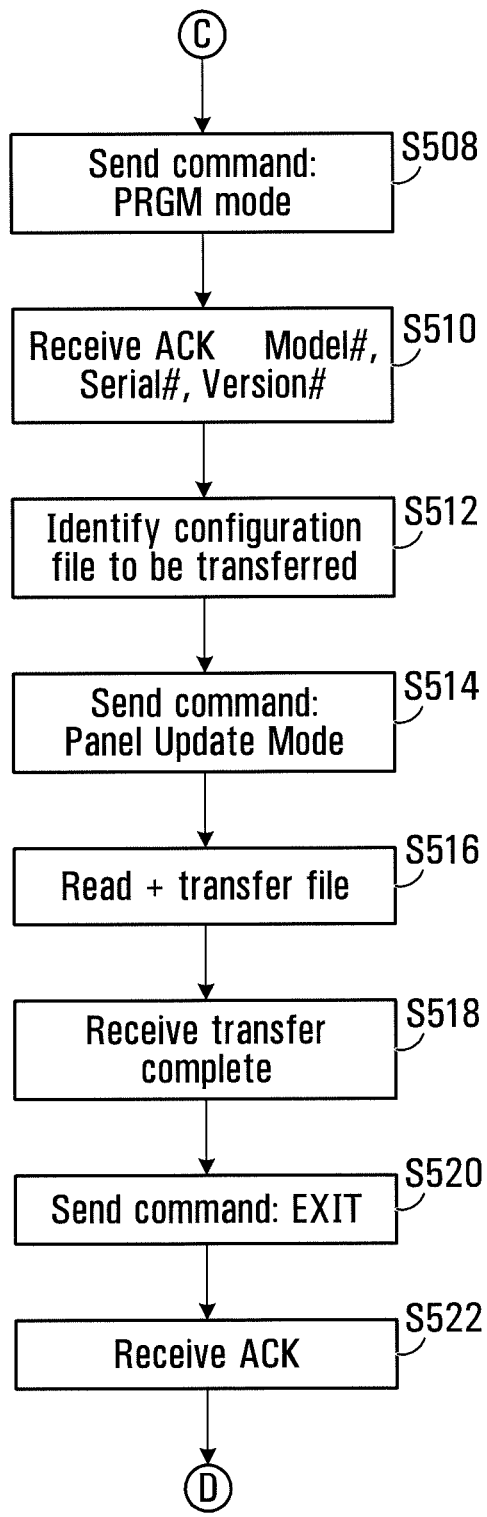
Figure 6B:
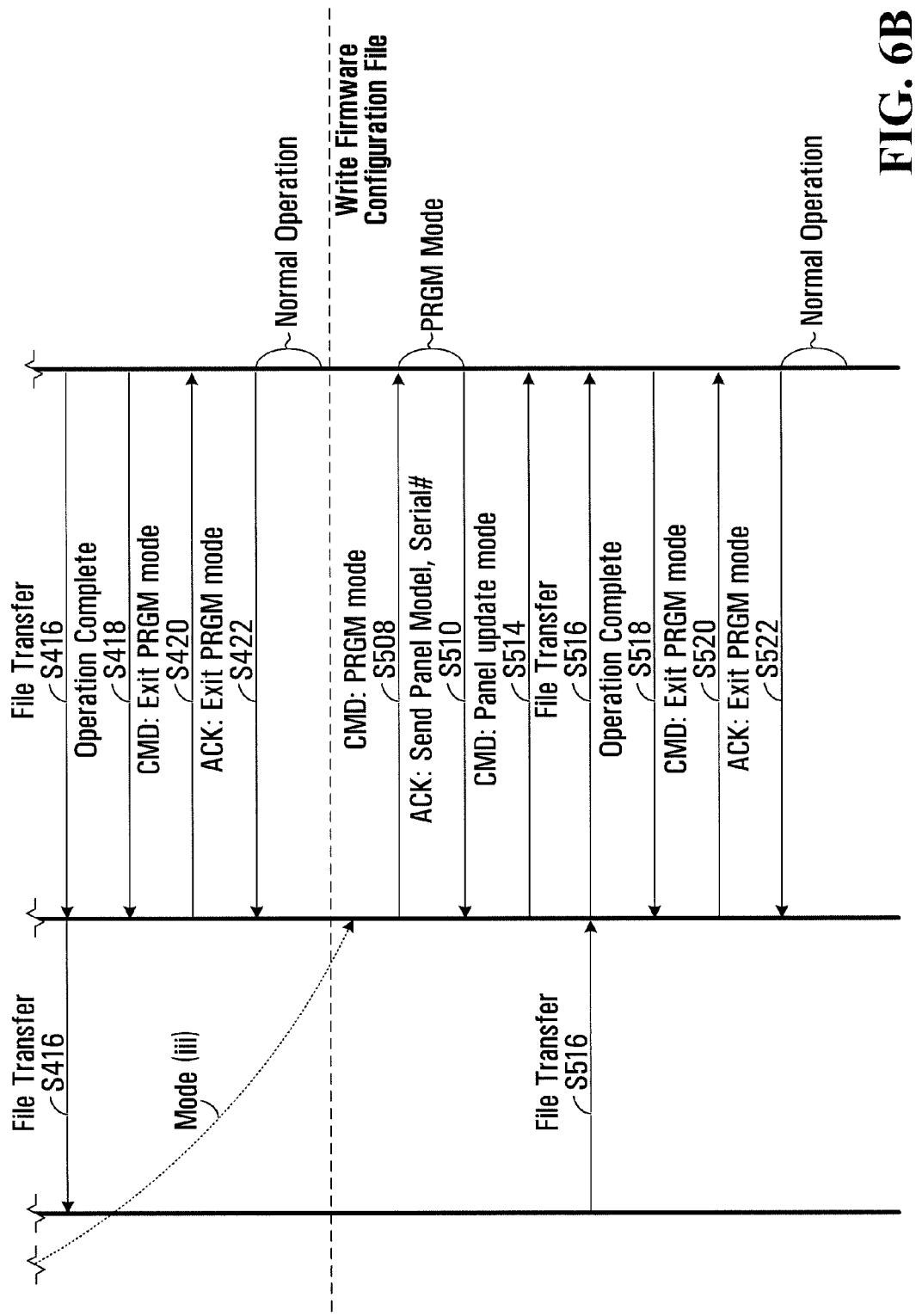

In mode iii) instructions within memory 22 cause microcontroller 20 to operate as illustrated in FIGS. 5, 6A and 6B to transfer a firmware file from memory 14 to panel 18. In mode (iii), device 10 assumes that memory 14 has been pre-loaded with with one or more files including alarm panel update data, in a conventional manner. As noted, the file should have an appropriate filename. In the illustrated embodiment, frimware files name may take the form "DCmodeIno_version_no.bin", such as "DC1832_V_1.bin".

As illustrated, microcontroller 20 again sends a suitable command to interconnected alarm panel 18 to place panel 18 in a programming mode in block S508. In block S510, microcontroller 20 receives an acknowledgment that alarm panel 18 is in program mode. The acknowledgment includes the identifier of the alarm panel (by model number) and optionally the alarm panel's serial number. Next, in block S512, microcontroller 20 uses the panel model number to form a filename of a desired firmware update file. The formed file number may take the form "DCmodeIno*.bin". If the file is found in the directory structure now stored in memory 22, microcontroller 20 places panel 18 into update mode, by sending a suitable command to panel 18 in block S416. That is, in block S516, microcontroller 20 may transfer the file having the filename DCmodeIno*.bin from memory 14 to alarm panel 18, using a file transfer (read) command identifying the file, from memory 14 and a file transfer (write) command to panel 18. Upon completion, microcontroller 20 receives a transfer compete message from alarm panel 18 in block S518. In response microcontroller 20 sends a command to exit programming mode to panel 18 in block S520. If all is successful, microcontroller 20 receives an operation complete message in block S522. Panel 18 may return to its normal operating mode.

If an error is detected at any time in blocks S300-S522, the error may be signalled by way of indicator(s) 24. For example, indicator(s) 24 could be repeatedly flashed.

Conveniently, alarm update tool 10 allows in field updating of alarm panel configuration and firmware without a personal computer, such as a laptop or the like. The alarm update tool may be carried in a conventional toolbox, and may be pre-loaded with multiple configuration files allowing an installer to pre-load update tool 10 with install files for a day's worth (or more) of panels (i.e., a day's worth or more of install files).

The described alarm update tool 10 is capable of uploading files to panel 18, and downloading files therefrom. A person of ordinary skill will easily appreciate an alarm update tool exemplary of an embodiment of the present invention, may be capable of only uploading without being capable of downloading, or may be capable of only downloading without being capable of uploading. Similarly, although memory 14 has been depicted as physically separate from tool 10, as person of ordinary skill will readily appreciate that memory 14 could be integrated with tool 10. Once memory 14 is integrated with tool 10, a USB port could be used to upload software from an external computing device to memory 22.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of updating configuration files for use by processors associated with a plurality of alarm panels, said method comprising:

loading a plurality of configuration files into a removable computer readable memory, the plurality of configuration files associated with a plurality of alarm panels;

connecting said removable computer readable memory to a memory port of a handheld portable alarm update too, said handheld portable alarm update tool comprising said memory port for receiving a removable computer readable memory, a serial port for interconnection to said plurality of alarm panels, by way of a complementary port and processor, independent of any processors forming part of said plurality of alarm panels;

interconnecting said handheld portable alarm update tool to said complementary port of a first one of said plurality of alarm panels;

executing processor executable instructions on said processor of said handheld alarm update tool, causing said processor of said alarm update tool to upload at least one of said plurality of configuration files to said first one of said plurality of alarm panels, by way of said serial port;

wherein the configuration files associated with the first one of said plurality of security alarm panels are different from the configuration files associated with at least a second one of said plurality of security alarm panels.

2. The method of claim 1, wherein said configuration file includes firmware to be loaded to said alarm panel, by way of said port of said panel.

3. The method of claim 1, further comprising retrieving a model number of said alarm panel from said alarm panel, and forming a filename of said configuration using said model number.

4. The method of claim 1, further comprising identifying a model of said panel, and selecting a specific configuration file based on said model.

5. The method of claim 4, wherein said selecting comprises selecting a file name of said configuration file matching said model.

6. The method of claim 1, further comprising determining a version number of a configuration file on said removable memory and a version number of a configuration file at said alarm panel, and uploading said configuration file on said removable memory to said alarm panel only if said version number of said configuration file on said removable memory supersedes said version number of said configuration file at said alarm panel.

7. The method of claim 1, further comprising:
interconnecting said handheld portable alarm update tool to said complementary port of the second one of said plurality of alarm panels; and executing processor executable instructions on said processor of said handheld alarm update tool, causing said processor of said alarm update tool to upload at least one other of said plurality of configuration files to said second one of said plurality of alarm panels, by way of said serial port.

8. The method of claim 1, further comprising placing the security alarm panel into an update mode by sending an update command to the panel prior to uploading said configuration file to said alarm panel, by way of said serial port.

9. The method of claim 8, further comprising, prior to sending the update command, sending a programming command to the alarm panel to place the panel in a programming mode.

10. The method of claim 9, further comprising sending, from the alarm panel, an acknowledgement that the alarm panel is in said programming mode.

11. A handheld portable alarm update tool for use by an alarm panel installer to update a plurality of security alarm panels, comprising a processor and memory, said alarm update tool comprising:
a memory interface for receiving a computer readable memory;
a serial port for interconnection to a complementary serial port of each of said security alarm panels;
a processor, independent of said processor of said security alarm panel;
processor readable memory in communication with said processor of said alarm update tool, storing instructions adapting said processor of said alarm update tool to:

(i) initiate serial transfers of configuration files between a removable memory received by said memory interface and said serial port of each of said plurality of alarm panels to update said memory of each of said plurality of security alarm panels; and (ii) at least one of upload or download said configuration files between said removable memory received by said memory interface and said memory of said plurality of security alarm panels;

wherein the configuration files associated with a first of said plurality of security alarm panels are different from the configuration files associated with a second of said plurality of security alarm panels.

12. The portable alarm update tool of claim 11, wherein said memory interface comprises a USB port.

13. The portable alarm update tool of claim 11, wherein said serial port comprises a PC-link serial port.

14. The portable alarm update tool of claim 11, wherein said processor of said alarm update tool comprises a microcontroller.

15. The portable alarm update tool of claim 14, wherein said microcontroller comprises an integrated USB port.

16. The portable alarm update tool of claim 15, further comprising a housing, housing said processor of said alarm update tool, said memory interface, and said processor readable memory, and further comprising a battery housed in said housing.

17. The portable alarm update tool of claim 16, wherein said housing has dimensions smaller than about 10 cm×5 cm×3 cm.

18. The portable alarm update tool of claim 11, further comprising visual indicator for signaling an error in uploading and downloading configuration files.

19. The portable alarm update tool of claim 11, wherein said configuration files include firmware to be loaded to said alarm panel, by way of said serial port.

20. The portable alarm update tool of claim 11, wherein said serial port operates at a voltage between 3 and 5 Volts.

21. The portable alarm update tool of claim 11, wherein said instructions further adapt said processor of said alarm update tool to identify a configuration file by file name for upload or download.

22. The portable alarm update tool of claim 21, wherein said instructions further adapt said processor of said alarm update tool to identify a configuration file among several files on said removable memory by file name for upload.

23. The portable alarm update tool of claim 21, wherein said instructions further adapt said processor of said alarm update tool to identify a configuration file at said alarm panel for download.

24. The portable alarm update tool of claim 11, wherein said instructions further adapt said processor of said alarm update tool to identify a model of said alarm panel, and a configuration file on said removable memory specific to said model by file name for upload.

25. The portable alarm update tool of claim 11, wherein said instructions further adapt said processor of said alarm update tool to upload configuration files from said removable memory to said alarm panel in a first mode and to download configuration files from said alarm panel to said removable memory in a second mode.

26. The portable alarm update tool of claim 25, further comprising a user-operable switch for selecting between at least said first mode and said second mode.

27. The portable alarm update tool of claim 26, further comprising at least one visual indicator for signaling a selected mode of at least said first mode and said second mode.

28. The portable alarm update tool of claim 11, wherein said instructions further adapt said processor of said alarm update tool to determine a version number of a configuration file on said removable memory and a version number of a configuration file at said alarm panel, and to upload said configuration file on said removable memory to said alarm panel only if said version number of said configuration file on said removable memory supersedes said version number of said configuration file at said alarm panel.

29. The portable alarm update tool of claim 11, the processor readable memory further storing instructions adapting said processor of said alarm update tool to use a panel model number to form a filename of a desired filed, and to send an update command to the panel when the file is found in a directory structure stored in the processor readable memory, wherein the updated command places the security alarm panel into an update mode.

30. The portable alarm update tool of claim 11, the processor readable memory further storing instructions adapting said processor of said alarm update tool to send a programming command to the alarm panel to place the panel in a programming mode, said programming command sent to the alarm panel prior to the update command.

31. The portable alarm update tool of claim 30, the processor readable memory further storing instructions adapting said processor of said alarm update tool to receive an acknowledgement that the alarm panel is in said programming mode.

* * * * *

UNITED STATES PATENT AND TRADEMARK OFFICE
CERTIFICATE OF CORRECTION

| | | |
|---|---|---|
| PATENT NO. | : 8,606,995 B2 | Page 1 of 1 |
| APPLICATION NO. | : 12/414688 | |
| DATED | : December 10, 2013 | |
| INVENTOR(S) | : Sharma et al. | |

It is certified that error appears in the above-identified patent and that said Letters Patent is hereby corrected as shown below:

In the Claims

Column 6, line 61 beginning with "memory port of a handheld", change the word "too," to read --tool,--

Column 9, line 17 beginning with "number for form a filename", change the word "filed," to read --file,--

Signed and Sealed this
Twenty-second Day of April, 2014

Michelle K. Lee
*Deputy Director of the United States Patent and Trademark Office*